Figure 1:
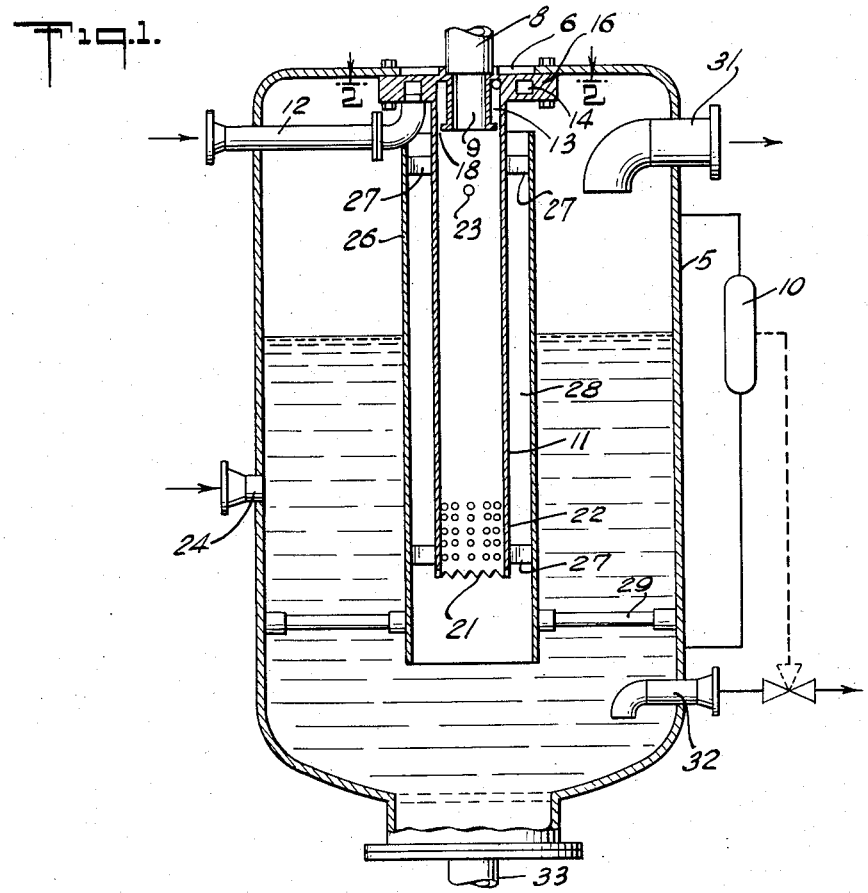

July 28, 1959 R. E. NAGLE ET AL 2,896,927
GAS AND LIQUID CONTACTING APPARATUS
Filed Sept. 26, 1956

United States Patent Office 2,896,927
Patented July 28, 1959

2,896,927
GAS AND LIQUID CONTACTING APPARATUS

Richard E. Nagle, New Rochelle, N.Y., and Du Bois Eastman, Whittier, Calif., assignors to Texaco Inc., a corporation of Delaware Application September 26, 1956, Serial No. 612,211

2 Claims. (Cl. 261—35)

The present invention relates to a method of and apparatus for intimately contacting gas with liquid.

In a number of commercial processes, hot gases at temperatures ranging from about 1000° F. to about 3000° F. must be quenched, i.e. rapidly cooled, to a temperature below that at which undesirable reactions take place, generally below about 600° F. Quench cooling of product gas streams by direct contact with water, or other liquid, previously has been suggested. Generally, the liquid is injected directly into the hot gas stream. Alternatively, the gas stream is conducted below the surface of the liquid and permitted to bubble up therethrough. At the higher temperatures, there is some danger in the former procedure in that should the source of supply of the quench liquid fail, the apparatus, which is usually fabricated of steel, may become overheated and destroyed. The present invention provides an improved method of and apparatus for contacting gas with liquid, particularly well suited to quenching a high temperature gas stream, for example synthesis gas, fuel gases, or cracked gases including gases containing olefins, diolefins and acetylene, by direct contact with a cooling liquid.

Carbonaceous fuels may be converted to carbon monoxide and hydrogen by reaction with steam, oxygen, or with a mixture of steam and free oxygen. Generally, the partial oxidation of carbonaceous fuels to carbon monoxide and hydrogen is conducted at a temperature above about 2000° F. Although the reaction may be carried out at atmospheric pressure, an elevated pressure above about 100 p.s.i.g. and preferably in the range of 200 to 600 p.s.i.g. is usually preferred. Even higher pressures may be desirable in some instances. The high temperature, high pressure gases present a quench problem which is adequately solved by the present invention.

The present invention comprises a quench vessel adapted to withstand operating pressure, generally a pressure equal to the pressure at which the gas is produced, and to contain a substantial quantity of liquid quenching agent. It is preferable to provide a quantity of liquid sufficient to permit continued operation of the apparatus for a substantial period of time without the necessity for the addition of liquid to the vessel. This reservoir of quenching liquid acts as a safety feature in the event that the supply of cooling liquid is cut off. A dip pipe connected with the source of supply of gas is disposed vertically within the vessel and extends downwardly to a point well below the normal liquid level in the vessel. Sufficient space is provided in the vessel above the normal liquid level to permit the withdrawal of gases substantially free from liquid therefrom. The dip tube preferably is open at its lowermost end which terminates a sufficient distance above the bottom of the vessel to prevent direct impingement of gases on the vessel. The dip tube preferably is provided at its lower end with a serrated edge and with perforations to permit the escaped gases outwardly through the wall of the dip tube. A vertically disposed conduit section surrounds the dip tube and extends from a point below the lowermost terminus of the dip tube to a point in the vapor sections of the vessel above the liquid level therein. At the inlet end of the dip tube means are provided for substantially uniformly distributing cooling liquid along the interior surface of the dip tube to prevent overheating of the portion of the tube not in direct contact with cooling liquid contained in the reservoir. Preferably the distributor comprises an annular member disposed within the upper portion of the dip tube and provided with an annular discharge port adjacent the inner side of the dip tube. In a preferred embodiment, means are provided for the introduction of cooling liquid tangentially to the annular member so that a swirling motion is imparted to the liquid within the annular member to insure distribution of the liquid along the entire inner surface of the dip tube.

My invention will be more readily understood with reference to the accompanying figures and the following detailed descriptions thereof.

Fig. 1 of the drawings is a vertical sectional view through a preferred form of apparatus for contacting gas with liquid in accordance with the present invention.

Figure 2:
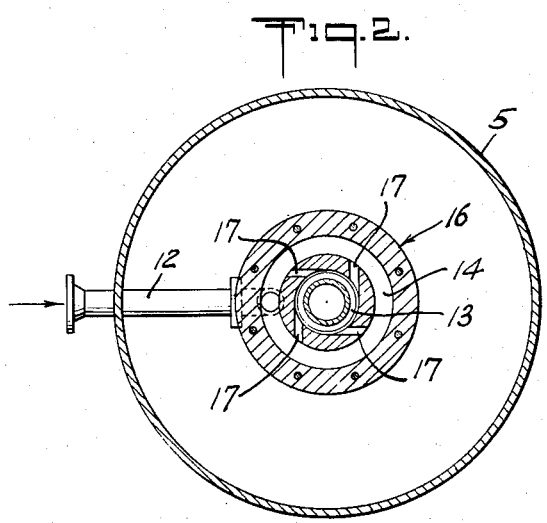

Fig. 2 is a horizontal sectional view taken along the plane 2—2 of Fig. 1.

With reference to the drawing, the quench vessel comprises a vertically extending pressure vessel 5 designed to withstand operating pressure and having a gas inlet 6 at its upper end.

Means are provided for maintaining a pool of liquid in the vessel. This may be accomplished by a float control 10 as illustrated. Gases to be contacted with liquid, e.g. hot gases to be quenched, are introduced into the vessel 5 from conduit 8 through a liquid cooled inlet nozzle 9 and a dip tube 11. Tube 11 is disposed vertically and axially within the vessel and terminates at a point above the bottom of the vessel. Nozzle 9 is surrounded with an annular passageway 13. Liquid from line 12 enters an annular passageway 14 in plate 16 and is distributed through channels 17 to annular chamber 13 as will be evident from Fig. 2. Channels 17 preferably are arranged to direct the cooling liquid from annular passageway 14 tangentially into annular chamber 13 imparting a swirling motion to the liquid therein. From chamber 13 the liquid is substantially uniformly distributed along the inner wall of dip tube 11 by an annular outlet 18 from annular chamber 13 adjacent the inner wall of tube 11. The liquid film on the inner wall of tube 11 introduced through annular outlet 18 prevents overheating of the tube.

The lower end of tube 11 is provided with serrations 21 and with perforations 22. Vent 23 in the upper portion of the dip leg above the normal liquid level in the quench vessel permits gases to enter the dip leg when the flow of reactants is discontinued so that quench liquid cannot be drawn from the quench vessel into the source of the hot gases.

Ordinarily, all of the cooling liquid is introduced through pipe 12. Additional cooling liquid may be supplied to the vessel, if desired, through nozzle 24.

A cylindrical shield 26 surrounds dip tube 11 and extends from a point below the lower terminus of tube 11 to a point near the upper extremity of vessel 5 (i.e. near plate 16). Shield 26 is supported from dip pipe 11 by lugs 27 which also serve to space the shield from the pipe providing a uniform annular passageway 28 therebetween. Spacer bars 29 attached to the wall of the vessel and to the lower portion of the shield stabilize the quench assembly within the quench vessel and maintain uniform spacing between the shield and the walls of the vessel.

Gas, substantially free from liquid, is drawn from the vessel through discharge port 31. Excess cooling liquid is withdrawn as required through outlet 32 in response to flow controller 10. A drain pipe 33 in the lowermost portion of the vessel permits withdrawal of liquid, and accumulated solids if present, therefrom.

In operation, gases enter the vessel through nozzle 9 and dip tube 11 and are conducted through tube 11 to a point below the liquid level in the vessel. The gases escape from the dip tube through perforations 22, supplemented, if necessary, by serrations 21, into annular passageway 28 between dip tube 11 and shield 26. The mixture of liquid and gas produced in annular passageway 28 has a much lower density than the liquid contained in the reservoir outside shield 26. This causes the mixture to rise due to the gas lift effect so that the liquid is carried by the gas up through the annular space 28 and out the top of shield 26, normally with sufficient velocity to cause the liquid to impinge against the upper portion of the gas quench vessel and against plate 16. In the space above the liquid level in the vessel, the liquid separates from the gas; gas substantially free from liquid is then withdrawn through outlet 31.

In the event the supply of cooling liquid is for any reason interrupted, for example by power failure or by equipment failure, the reservoir of liquid maintained within the quench vessel, in itself, provides a safety feature. Quenching of the hot gas and cooling of the dip tube 11 by the above-described gas lift effect in annular space 28 continues until the supply of cooling liquid has been depleted by vaporization. This provides ample time for shutdown of the equipment thereby preventing costly equipment failures.

Obviously, many modifications and variations of the invention, as hereinbefore set forth, may be made without departing from the spirit and scope thereof, and therefore only such limitations should be imposed as are indicated in the appended claims.

We claim:
1. In a gas scrubbing apparatus wherein gas at elevated temperature is intimately contacted with cooling liquid by introducing said gas into a body of said liquid, the improvement which comprises, in combination, a vessel providing a liquid space and a vapor space; a vertically disposed conduit having an open end extending below the normal liquid level in said vessel for introducing said gas into said vessel into direct contact with said liquid contained therein; means for introducing said gas at said elevated temperature into the upper portion of said conduit; a tubular section open at both ends surrounding said conduit and forming an annular passageway for fluid intermediate said tubular section and said conduit, said tubular section extending from a point below the lowermost end of said conduit to a point within the vapor space within said vessel and along substantially the entire length of said conduit containing said gas in normal operation; means defining an annular passageway surrounding said gas inlet means at the upper end of said conduit arranged for continuously introducing and substantially uniformly distributing said liquid directly into contact with the inner wall of said conduit at the point of introduction of said hot gas thereto whereby during operation of said apparatus said conduit is protected from overheating by said hot gases due to the combined effect of cooling of said inlet pipe by said liquid along the inner wall thereof and by liquid carried upwardly through said first mentioned annular passageway along the outside of said inlet conduit by the gas lift effect of said gas stream; and means for withdrawal of gas from the vapor space within said vessel.

2. Apparatus as defined in claim 1 wherein said apparatus comprises means disposed within said conduit defining an annular chamber within said conduit and having means for the introduction of liquid tangentially thereinto and for the discharge of resulting swirling stream of liquid substantially uniformly along the inner wall of said conduit and for the introduction of said gas at elevated temperature into the interior of said conduit.

References Cited in the file of this patent
UNITED STATES PATENTS

| | | |
|---|---|---|
| 981,494 | Strohn | Jan. 10, 1911 |
| 1,153,181 | Steedman | Sept. 7, 1915 |
| 1,464,918 | Andrews | Aug. 14, 1923 |
| 1,732,893 | Hunt | Oct. 22, 1929 |
| 1,875,755 | Noyes | Sept. 6, 1932 |
| 2,303,757 | Pierson | Dec. 1, 1942 |
| 2,677,601 | Ruth | May 1, 1954 |
| 2,721,065 | Ingram | Oct. 18, 1955 |
| 2,818,326 | Eastman et al. | Dec. 31, 1957 |

FOREIGN PATENTS

| | | |
|---|---|---|
| 2,140 | Great Britain | Jan. 26, 1912 |